UNITED STATES PATENT OFFICE 2,579,871

DIVINYL SULFONE TANNED PROTEINS

Dwight L. Schoene, Naugatuck, Conn., assignor to United States Rubber Company, New York, N. Y., a corporation of New Jersey No Drawing. Application June 9, 1949,
Serial No. 98,165

5 Claims. (Cl. 8—127.5)

This invention is concerned with new and novel, modified proteins, and a process for producing them.

An object of the invention is to provide new and novel modified protein products. A further object is to react protein substances as they exist in various vegetable and animal substances with divinyl sulfone. A still further object is to utilize the reaction of divinyl sulfone with protein substances in the tanning of animal hides and skins, and in rendering wool alkali-resistant. Further objects will be apparent from the hereinafter set forth description.

I have found that proteins will react with vinyl sulfone, $(CH_2=CH)_2SO_2$, to give products having appreciably altered properties, and which have utility for a number of applications.

The reaction takes place readily, in some instances without a catalyst, although for most purposes I prefer to add a small quantity of an alkaline catalyst. The simplest reaction medium is water but organic solvents or dispersants may be used if desired. A variety of reaction procedures may be used depending upon the protein and the end use of the product. For example, wool may be moistened with a dilute aqueous solution of vinyl sulfone and then dipped into a solution of dilute alkali. The reaction takes place within a few minutes at room temperature. Alternatively, the protein may be moistened first with alkali solution and then with the vinyl sulfone solution. In another method the protein, e. g., casein, is dissolved in alkali and the viscous solution is treated with vinyl sulfone which causes rapid gelation. Non-aqueous treatments are equally effective. In such cases the protein is treated first with the alkali solution and dried, after which the vinyl sulfone is added directly or in solution in an organic solvent such as benzene. As before, the reaction takes place rapidly.

The products of the reaction are characterized by their insolubility in protein solvents. The treatment also confers upon the proteins a good measure of dimensional stability to heat, water, solvents and the like. For example, untreated hide substance shrinks rapidly and partially dissolves in hot water (50–100° C.). After treatment with vinyl sulfone the product is resistant to boiling water. In other words, the treatment provides a new method for tanning leather.

The concentration of vinyl sulfone required varies with the properties desired in the final product. For example, casein solutions treated with as little as 0.10 percent of vinyl sulfone, based on the weight of the casein, are altered in viscosity whereas treatments with vinyl sulfone at concentrations ranging from about 1 to 50 percent produce insoluble gels. For tanning purposes concentrations of 0.2 to 20% of the sulfone, based on the weight of the skin to be tanned, may be used.

As catalysts, any material which will produce a hydrogen ion concentration in water of $10^{-10}$ per liter will suffice. Materials having alcoholic hydroxyls or amino hydrogen should be avoided since these will react with the vinyl sulfone. Examples of effective catalysts are sodium and potassium hydroxides, calcium and barium hydroxides, the carbonates and phosphates of sodium and potassium, the quaternary ammonium hydroxides such as benzyl trimethylammonium hydroxide and the tertiary amines such as trimethyl and triethyl amines. The catalysts are effective but somewhat slow at concentrations as low as 0.1% based on the protein. For most cases concentrations in the range of 0.5 to 5% are preferred although concentrations up to 40% may be employed satisfactorily.

The reaction is equally applicable to animal and vegetable proteins which include such types as casein, soybean protein, zein, glutenin, gliadin, globulin, hides and skins, oil and vegetable tanned leathers, wool, silk, albumin, gelatin, keratin, collagen, glue, and the like. The reaction takes place readily at room temperature (ca. 25° C.) although temperatures ranging from 0° to 100° C. may be employed, if desired.

The modified proteins produced by reactions with vinyl sulfone are useful in a number of applications. Wool is rendered alkali resistant which permits the use of alkaline vat dyes. Casein soybean protein and gelatin can be insolubilized to provide paper with improved wet strength or a permanent size for fabrics. Leather of improved stability and water resistant glue can also be obtained.

The following examples illustrate the invention:

Example 1

A 10% solution of gelatin in 2% aqueous sodium hydroxide was mixed rapidly with an equal volume of a 10% aqueous solution of vinyl sulfone. Within a few seconds the solution gelled giving an opaque yellow semi-solid. It dried to a hard, horn-like mass which was no longer soluble in water or alkali.

Example 2

A semi fluid solution of gelatin in water was treated with 5% vinyl sulfone by weight of the gelatin. The addition of an equal volume of 5% aqueous sodium hydroxide solution caused gelation within a few minutes.

Example 3

A 20% solution of casein in a potassium hydroxide boric acid buffer solution having a pH of about 10 was treated with 1% vinyl sulfone by weight of the total solution. The solution formed a rigid gel in about 30 minutes at room temperature.

Example 4

A piece of dehaired and bated sheepskin, still wet, was covered with a 10% solution of vinyl sulfone in water. After 20 minutes it was placed in a solution containing 2% aqueous sodium hydroxide and 10% salt in water. This caused the skin to become much more resilient than a control placed in the alkali solution directly. After 20 minutes in alkali the sample was leached in dilute acetic acid, washed with water and dried. It was translucent, tough and flexible. A test portion was heated to boiling in water and shrank less than 10%. It remained tough and strong. The control shrank markedly in water at about 50° C. and almost completely disintegrated on boiling.

Example 5

Example 4 was repeated using a 3% vinyl sulfone solution with a contact time of 3 hours. The alkali treatment time was increased to 1 hour. Part of the final product was boiled in water for 15 minutes without causing any appreciable shrinkage. The boiling softened the hide somewhat making it more flexible than the unboiled portion.

Example 6

Samples cut from the same piece of a commercial, oil-tanned chamois skin were soaked for 45 minutes in aqueous solutions containing 0.5%, 2%, and 5%, respectively, of vinyl sulfone. All three solutions also contained 0.1% of a commercial wetting agent. The wet pickup was 200%. The samples were then placed in a solution containing 2% sodium hydroxide and 15% sodium sulfate. After 25 minutes they were washed in dilute acetic acid and in water and were dried. They became slightly stiffer than the control. Their dimensions after treatment were the same as the control which had been washed with cold water.

The samples, along with the control, were placed in water at 55° C., heated to 90° C. and cooled to room temperature with the following results:

1. Control—shrank 30% at 55° C.
2. 0.5% vinyl sulfone—shrank 15% at 55° C.
3. 2.0% vinyl sulfone—shrank 10% at 80° C.
4. 5.0% vinyl sulfone—shrank 10% at 85° C.

Samples (3) and (4) returned to their original treated dimensions on cooling.

This experiment demonstrates that vinyl sulfone is an effective retanning agent for leather.

Example 7

A strip of a commercial, vegetable tanned cowhide belt was soaked for 30 minutes in acetone and air dried. It was cut into two portions, one of which was placed in an aqueous solution containing 5% vinyl sulfone and 0.1% of a commercial wetting agent. The other was placed in a similar solution containing no vinyl sulfone. After 18 hours the liquid was poured off and replaced by an aqueous solution containing 2% sodium hydroxide and 15% salt. This extracted some of the tannin and made the solution and leather dark brown. After 3 hours the samples were leached for an hour in dilute (1%) acetic acid followed by water. The acid regenerated the original tan color.

The samples were then boiled for 5 minutes in water along with a portion of the original belting. This caused both the controls to become dark brown and curl. The vinyl sulfone treated sample was not visibly changed. After drying, the controls gave over 20% area shrinkage while the vinyl sulfone treated sample shrunk less than 10%. It also remained flexible while the two control samples were hard and brittle.

Example 8

A piece of wool flannel was dipped into a freshly prepared aqueous solution containing 3% vinyl sulfone and 2% sodium hydroxide, squeezed to about 200% wet pickup, and allowed to stand at room temperature. A control sample was similarly treated with 2% sodium hydroxide solution containing no vinyl sulfone. After an hour, both samples were washed in dilute acetic acid and water and dried. The treatment caused 30% shrinkage of the alkali treated sample and only 15% shrinkage of the sulfone-alkali treated material. The alkali treated sample had a harsh feel while the sulfone-alkali treated sample was only slightly poorer than the untreated wool. The alkali treated sample and the untreated control were almost completely disintegrated by a 5% sodium hydroxide solution at room temperature. Under the same conditions the vinyl sulfone-alkali treated sample was not visibly altered by 5% sodium hydroxide.

Example 9

A piece of wool flannel was dipped into an aqueous 5% solution of vinyl sulfone containing 0.1% of a commercial wetting agent and was then immersed in an aqueous solution containing 1% sodium hydroxide and 20% sodium sulfate. After 30 minutes the flannel was washed with dilute acetic acid and water and dried. The treatment had no noticeable effect on the hand of the fabric and yet, as in Example 7, it made the wool alkali resistant.

Example 10

To solutions of 10 parts of a commercial soybean protein in 50 parts of 5% aqueous sodium hydroxide were added 0.5 part and 0.1 part, respectively, of vinyl sulfone. Both solutions gelled within a minute. Similar results were obtained when sodium carbonate replaced the sodium hydroxide.

Example 11

A paste of 10 parts of zein in 20 parts of water was treated with 1 part of vinyl sulfone. This treatment caused the zein to agglomerate but, after 30 minutes, a test portion was still soluble in 80% ethanol. The balance of the mixture was treated with 5 parts of 25% sodium hydroxide. 30 minutes later, the zein would no longer dissolve in 80% ethanol, indicating reaction.

Example 12

10 parts of zein dispersed in 50 parts of a 10% aqueous sodium oleate solution containing excess sodium hydroxide was treated at 50° C. with 1 part of vinyl sulfone. Within a minute the reaction product precipitated and would no longer dissolve in 80% ethanol.

Having thus described my invention, what I claim and desire to protect by Letters Patent is:

1. A method of tanning animal skins which comprises reacting protein substance of the skin in situ with divinyl sulfone.

2. A method of treating wool which comprises reacting the protein thereof with divinyl sulfone in the presence of an alkaline catalyst.

3. A method of preparing modified proteins having increased dimensional stability to heat, water and solvents, comprising reacting the protein with divinyl sulfone in the presence of an alkaline catalyst.

4. A method of preparing modified proteins having increased dimensional stability to heat, water and solvents, which proteins are selected from the class consisting of soybean, gelatin, zein, casein, wool, and animal skin protein, comprising reacting the protein with divinyl sulfone, in the presence of an alkaline catalyst.

5. A method which comprises reacting casein with divinyl sulfone in the presence of an alkaline catalyst.

DWIGHT L. SCHOENE.

REFERENCES CITED

The following references are of record in the file of this patent:

UNITED STATES PATENTS

| Number | Name | Date |
|---|---|---|
| 2,290,294 | Riess | July 21, 1942 |

FOREIGN PATENTS

| Number | Country | Date |
|---|---|---|
| 471,010 | Great Britain | Aug. 26, 1937 |
| 18,692/34 | Australia | Feb. 7, 1935 |

OTHER REFERENCES

Chem. Abstracts, vol. 41, p. 6306 (1947) citing: Kinsey et al., Jour. of Cellular & Comparative Phys., vol. 29 (1947), pp. 95 to 108.

Chem. Abstr., vol. 42, pp. 247–248 (1948) citing: Kinsey et al., Jour. of Cellular & Comparative Phys., vol. 29 (1947), pp. 289 to 299.

Jour. of Org. Chem., vol. 11, pp. 719–735, Nov. 1946.